UNITED STATES PATENT OFFICE.

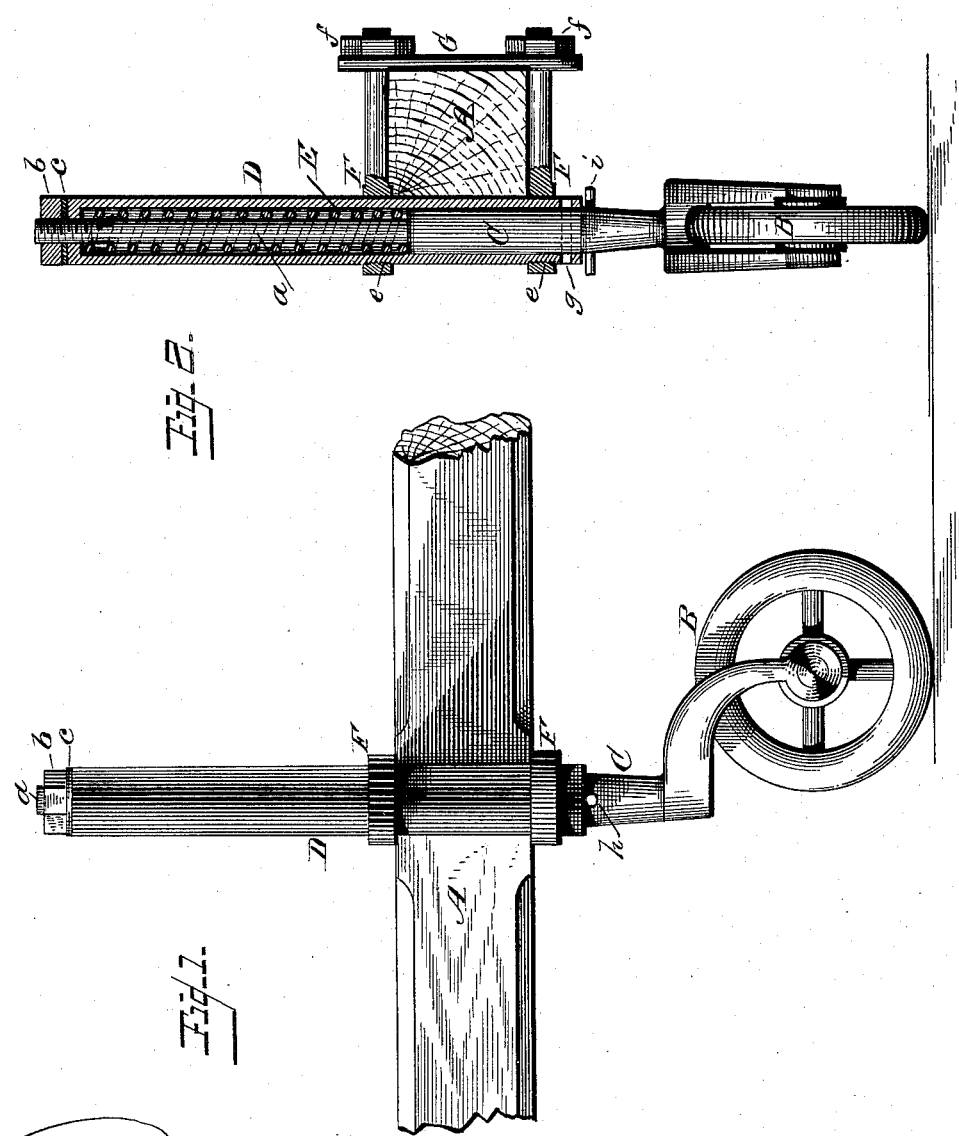

JOHN E. MARSHALL, OF SAEGERTOWN, PENNSYLVANIA.

PLOW.

SPECIFICATION forming part of Letters Patent No. 319,499, dated June 9, 1885.

Application filed November 20, 1884. (No model.)

*To all whom it may concern:*

Be it known that I, JOHN E. MARSHALL, a citizen of the United States, residing at Saegertown, in the county of Crawford and State of Pennsylvania, have invented certain new and useful Improvements in Plows; and I do hereby declare that the following is a full, clear, and exact description of the same, reference being had to the annexed drawings, making a part of this specification, and to the letters and figures of reference marked thereon.

Figure 1 of the drawings is a side elevation of my invention, and Fig. 2 an end view thereof, partly in section.

The present invention has relation to certain new and useful improvements in caster-wheels for plows or other agricultural machines; and it consists in the details of construction substantially as shown in the drawings, and hereinafter described and claimed.

In the accompanying drawings, A represents a beam of a plow, to which is connected the caster-wheel B in the following manner: The wheel B is journaled in the bifurcated or forked end of an upright shaft, C, formed with a reduced shank, $a$, screw-threaded at its upper end to receive a screw-threaded nut, $b$. The shaft C and shank $a$ pass up through a tube or housing, D, closed at its upper end, but having a hole of sufficient size to admit the screw-threaded portion of the shank to project for connecting thereto the nut $b$, a suitable washer, $c$, being interposed between it and the end of the tube or housing. Encircling the shank $a$ is a spiral spring, E, the lower end bearing against the shoulder formed by the reduced shank, as shown at $d$, while the upper end of the spring bears against the closed end of the tube or housing. The tube or housing D is secured to the beam A by eye-bolts F, the interior of the eyes of said bolts being preferably serrated, as shown at $e$, to prevent the tube or housing from slipping. A clamping-plate, G, is provided with holes or perforations, through which pass the screw-threaded ends of the eyebolts F, and the plate firmly held against the beam A by nuts $f$. The lower extremity of the tube or housing D has a diametrical perforation, $g$, as has also the shaft C, shown at $h$, these perforations being intended for the reception of a locking-pin, $i$.

When the pin is not placed in either of the perforations, the wheel, when meeting any obstruction—such as a stone or other object—or on hard and rough ground, will yield by the shaft C passing or moving upward in the tube or housing, the spring E forcing it back to its normal position after the wheel has passed over the obstruction. The tension of the spring E is regulated by the nut $b$ on the screw-threaded end of the shank $a$. For instance, should the tension of the spring require increasing the shank is drawn farther up into the tube by the nut, thus compressing the coils of the spring and rendering the wheel less sensitive to the obstruction over which it passes, and by unscrewing the nut the coils of the spring are extended with an opposite result.

To prevent the spring from acting, when required to use the wheel without its yielding, as above described, the pin $i$ is inserted in the perforation $h$ of the shaft C, preventing the latter from any vertical motion in the tube or housing, but admitting, as before, of turning on its axis. Should it be found desirable to have the shaft C perfectly rigid, or not move either horizontally or vertically, the pin $i$ is withdrawn and the shaft slightly pushed into the tube or housing and turned so that the two perforations will come in line or register with each other, after which the pin is passed through both perforations, firmly holding the shaft stationary. The tube or housing can also be adjusted, when required, to increase or diminish its height with relation to the beam, the serrations upon the interior of the eyes of the bolts firmly holding the tube or housing in its adjusted position and preventing it from slipping.

It will be seen that provision is made for adapting the caster-wheel to all classes of work and different qualities of the soil and surface of the ground, and therefore equally applicable to all kinds of agricultural machines where a caster-wheel is found useful.

Having now fully described my invention, what I claim as new, and desire to secure by Letters Patent, is—

1. The combination, with a tube or housing having a perforation through its lower extremity, of a caster-wheel having its shank perforated to coincide with the perforation in the housing and a pin, substantially as and for the purpose set forth.

2. A caster-wheel having a perforated shaft, a reduced screw-threaded shank, and coiled spring encircling the same, and regulating-nut engaging with the screw-threaded end of the shank, in combination with a perforated tube or housing incasing said spring and vertically adjustably connected to the beam of a plow or other agricultural machine, and a pin adapted to engage with the perforations, substantially as and for the purpose described.

In testimony that I claim the above I have hereunto subscribed my name in the presence of two witnesses.

JOHN E. MARSHALL.

Witnesses:
  WILSON HUNTER,
  LEON M. HUNTER.